United States Patent [19]

Latimer et al.

[11] 4,407,716

[45] Oct. 4, 1983

[54] LIQUID FLOW SYSTEM INCLUDING MULTI-AXIAL LIQUID FLOW SCREENING MEANS FOR EXCLUDING OVERSIZED SLENDER OBJECTS CARRIED BY A LIQUID

[75] Inventors: John P. Latimer; Glenn E. Miller, both of Newport News, Va.

[73] Assignee: Deepsea Ventures, Inc., Gloucester Point, Va.

[21] Appl. No.: 271,551

[22] Filed: Jun. 8, 1981

[51] Int. Cl.³ .................... B01D 35/02; B01D 35/28; E02F 3/94
[52] U.S. Cl. .................................. 210/155; 209/675; 37/57; 37/DIG. 8; 138/42
[58] Field of Search ............... 209/250, 262, 263–267, 209/356, 659, 660, 675; 55/278, 440, 436, 489; 210/488, 492, 521, 522, 159, 155; 37/57, 58, DIG. 8; 138/42

[56] References Cited

U.S. PATENT DOCUMENTS

| | | | |
|---|---|---|---|
| 1,555,574 | 9/1925 | Herrmann | 210/488 |
| 1,810,090 | 6/1931 | Sell | 55/440 |
| 2,065,871 | 12/1936 | Rehfus | 55/489 |
| 2,747,744 | 5/1956 | Gretzinger | 210/488 X |
| 2,793,017 | 5/1957 | Lake | 55/440 X |
| 3,800,615 | 3/1970 | Meek | 55/489 |
| 3,813,855 | 6/1974 | Hill | 55/440 |

FOREIGN PATENT DOCUMENTS

| | | | |
|---|---|---|---|
| 1158942 | 12/1963 | Fed. Rep. of Germany | 210/488 |
| 1114744 | 12/1955 | France | 210/488 |
| 1456822 | 11/1976 | United Kingdom | 55/440 |

*Primary Examiner*—David L. Lacey
*Attorney, Agent, or Firm*—Barry G. Magidoff

[57] ABSTRACT

A liquid flow system which comprises means to screen long slender objects from a liquid flowing in a conduit. The screening means comprises a set of opposed, aligned, undulating surfaces, each having axes of curvature extending in at least two directions. In another embodiment there is a primary set of corrugated surfaces, with axes extending in a single direction transverse to the direction of fluid flow, and a secondary set of corrugated surfaces mounted on the primary set with axes transverse to the direction of fluid flow and transverse to the axes of the primary set. The undulating surfaces are preferably formed as primary corrugated plates with secondary corrugated plates transversely mounted on each primary corrugated plate. The primary corrugated plates can be moved apart to permit the removal of trapped debris. Dimpled plates can alternatively be us

11 Claims, 11 Drawing Figures

LIQUID FLOW SYSTEM INCLUDING MULTI-AXIAL LIQUID FLOW SCREENING MEANS FOR EXCLUDING OVERSIZED SLENDER OBJECTS CARRIED BY A LIQUID

This invention is directed to means for dredging particles from the floor of a body of water, and especially protecting the dredging devices used for the mining of ocean floor nodule ores from the surface of the ocean floor, by limiting the intake of oversize particles.

With the recognition that terrestrial sources for raw materials, especially ores, are being swiftly depleted, effort has been made to obtain these valuable industrial raw materials from other sources, most especially the abyssal depths of the oceans. Such sources are generally to be found at depths of between 10,000 and 18,000 feet, requiring extremely deep water dredging means. The most valuable ores found to date are known as ocean floor nodule ores, or manganese nodules. These materials are often found as relatively small particulate forms, including fist-sized rocks or smaller pebbles or elongated pieces, or even as grains of sand. In addition to the ore particles, the ocean floor is also littered with the detritus of eons of ocean use by man as well as by the lower orders of animals, such as pieces of flotsam from man's manufactured ships, or the hard, durable, often fossilized, remains of dead animals, such as the bones of large fish or sea mammals.

A great deal of engineering effort has been undertaken to date to secure these ores and bring them to the surface for further processing.

The deposits of these valuable metal ores are often lying on the surface of the soft sea floors, in the form of fist-sized rocks, often partially immersed within a sediment layer on the ocean floor. The exact size of the ore pieces vary greatly, from relatively small pebbles or even sand-like grains, up to large rocks or even boulders. The smaller of such ore pieces can be directly secured by one form of mining machine designed to date, and that is the suction head dredge vehicle.

Such a suction-type dredging apparatus literally draws the ore particles, much in the way of a vacuum cleaner, into the mining system, eventually transferring the thus collected particles via elevator means from the dredge vehicle to a surface vessel. The present preference is to carry the ore particles to the surface vessel entrained in liquid, especially sea water, and most especially in an airlift system.

When dredging for the valuable nodule ores at the bottom of the ocean, the ore gathering device should be as efficient and as durable as possible, in order to compensate for the great expense of collecting the ore from a location at least about 3 miles beneath the surface of the ocean. The suction effect of the nozzle has been made sufficiently great to be able to literally tear out the ore particles that are embedded within the silt and mud on the ocean floor. Of necessity, this results in the intake of not only the desired nodules, but also of the varied detritus mixed with the ore. The material that is the same size as the desired ore particles is picked up and carried through the dredge vehicle with no difficulty. The larger detritus as well as oversize ore particles have been screened out by conventional means, such as mesh work or parallel or otherwise placed rods over the intake to the nozzle. There can, however, be a problem with long slender pieces that could pass through the prior screening means if they are oriented along the longer axis. Once inside the system, they are capable of jamming the flow ducts, or even of causing serious damage to the system, for example, to a pump impeller on the dredge vehicle. This would necessitate halting dredging and perhaps bringing the dredge up to the surface for repairs.

In accordance with the present invention, means are provided to collect particulate solids from the bottom of a body of water, and more especially from the ocean floor, utilizing a negative pressure, or suction, to draw, e.g., the ore particles, into the collection system, and including specifically means to provide for the improved protection of the ore collection system by the screening of particles about all three dimensions. In particular, this invention is most effectively used in the context of a suction nozzle and dredge head assembly, adapted for gathering objects from the ocean floor, the assembly comprising a nozzle having a nozzle opening adjacent a first end thereof, the nozzle and dredge head assembly having interconnected internal surfaces defining a fluid flow conduit for the flow of fluids, from the nozzle opening through the nozzle assembly and the dredge head assembly, and inlet means designed to provide a fluid-flow connection from the dredge head assembly to elevator means for carrying dredge material from the ocean floor to the ocean surface. The improvement comprises screening means for excluding long slender objects, the screening means comprising a set of complementary pairs of undulating, or corrugated, e.g., folded or dimpled, surfaces with axes of curvature of each surface extending in more than one direction. Each pair of adjacent surfaces are complementary, such that a convex surface is facing a concave surface.

Preferably, the undulating surfaces are provided by a plurality of plates supported within the fluid flow conduit, each plate being secured to an internal surface of the conduit, and extending between opposing sides of the conduit, so as to divide the conduit into, preferably, several curved flow passages. The plates are separated so as to prevent the passage of objects having dimensions greater than a predetermined value. The plates themselves could be constructed out of porous material, e.g., a mesh, to limit the drag on the flowing fluid, or a nonporous material. However, the plates are preferably rigid.

In one such preferred embodiment each undulating surface is formed from transversely attached corrugated plates; a primary corrugated plate has axes transverse to the intended direction of fluid flow. The primary plates are connected to the conduit walls and are so separated as to prevent the passage of objects having a predetermined length. Further, preferably, the primary corrugated surfaces are substantially parallel and the axes of the folds extend perpendicularly to the intended direction of fluid flow and optimally transversely to the long dimension of the cross-section of the conduit.

Each primary corrugated plate has affixed to its corrugated surface a plurality of opposed secondary corrugated plates; the axes of the folds of the secondary corrugated surfaces extend transversely to the axes of the folds of the primary corrugations and to the direction of fluid flow. The secondary corrugated surfaces prevent the passage of long slender objects oriented in such a way that the primary corrugations alone would not prevent their passage, i.e., with the long axis parallel to the axes of the folds of the primary corrugations.

Most preferably, the corrugated surfaces are curvilinear wave forms. In one preferred embodiment the amplitude of the folds of the primary corrugated surfaces, and the spacing between these surfaces is such that any straight line extending in the direction of fluid flow and parallel to any portion of the primary corrugated surface must intersect an adjacent corrugated surface. In the same preferred embodiment, the secondary corrugated surfaces are spaced at a distance such that a long slender object (longer than the largest nodule that the lift mechanism can handle), oriented with its axis parallel to the axes of the folds of the primary corrugated surface, would be trapped by the secondary surface folds.

In a further preferred embodiment, release means are provided for the clearing of any objects captured by the corrugated screening means, comprising means to move the undulating or corrugated surfaces relative to each other and/or relative to the internal surfaces of the conduit. The undulating or corrugated surfaces are preferably formed on rigid plates that are movably connected to one of the internal surfaces of the duct and to each other.

A further understanding of the present invention can be obtained by reference to the preferred embodiments set forth in the illustrations of the accompanying drawings. The illustrated embodiments, however, are merely exemplary of certain presently known preferred means for carrying out the present invention. The drawings are not intended to limit the scope of this invention, but merely to clarify and exemplify, without being exclusive thereof.

Referring to the drawings.

The present invention for the screening of long slender particles can be most effectively used in the context of a suction dredge system for the mining of ocean floor nodule ores. Such a system is shown in the commonly assigned co-pending previously filed application Ser. No. 232,835 filed Feb. 9, 1981 now U.S. Pat. No. 4,347,675. The description of that system is hereby incorporated by reference, particularly relevant being those portions describing the dredge vehicle and the duct 24 connecting the dredge nozzle to the dredge pump and the location of the screen in the duct 24.

Referring to FIGS. 1-4, mounted along the fluid carrying duct 24 is a corrugated plate system, generally indicated by the numeral 84, which extends beyond the side wall of the duct 24. Supported thereon by a mechanism described below are a series of pairs of mounting plates 86. Each adjacent pair of mounting plates, 86 supports mutually parallel corrugated screening plates 87.

Figure 4:
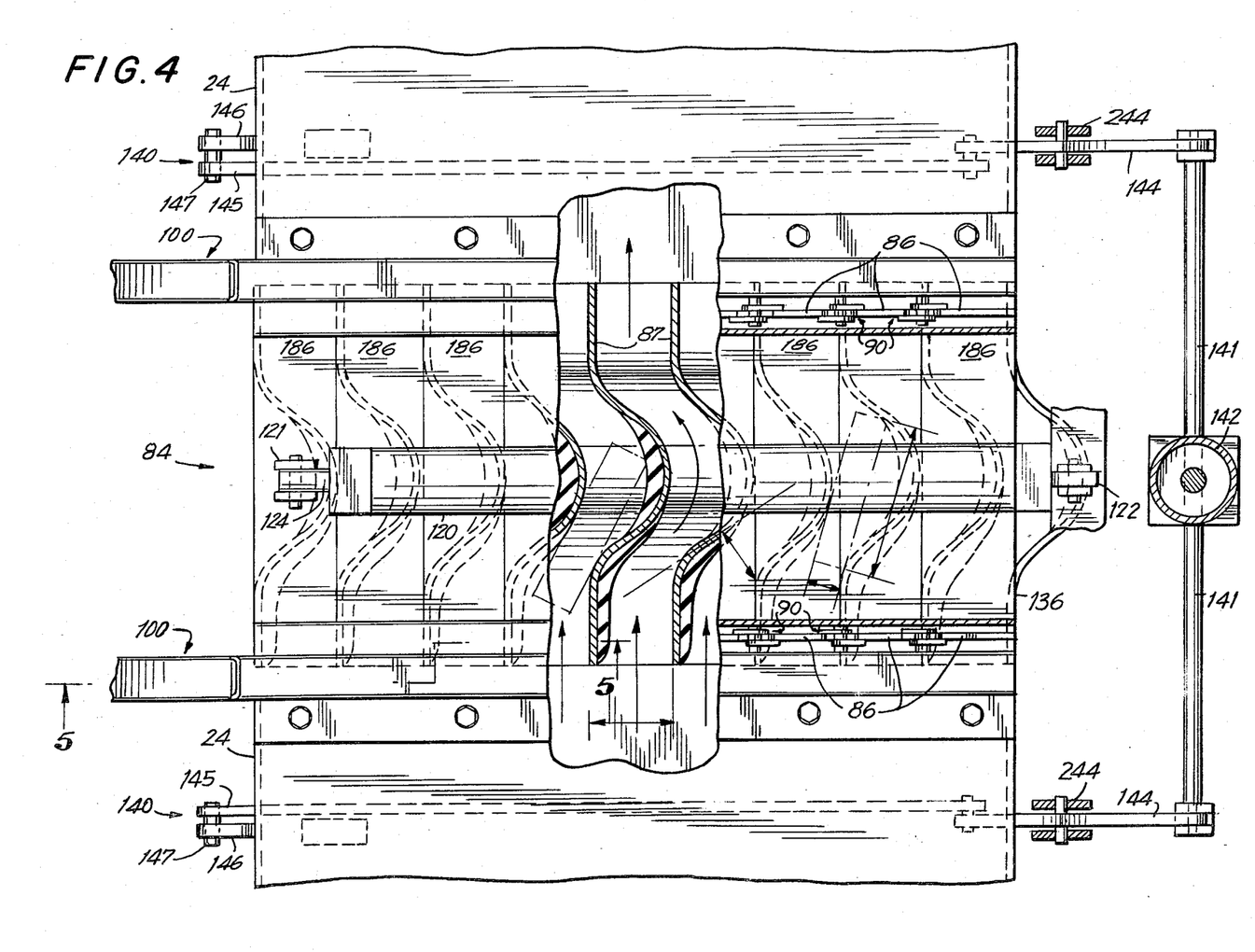
FIG. 4 is a top view of the embodiment of FIG. 1 in partial section taken along lines 4—4 of FIG. 3.
Figure 5:
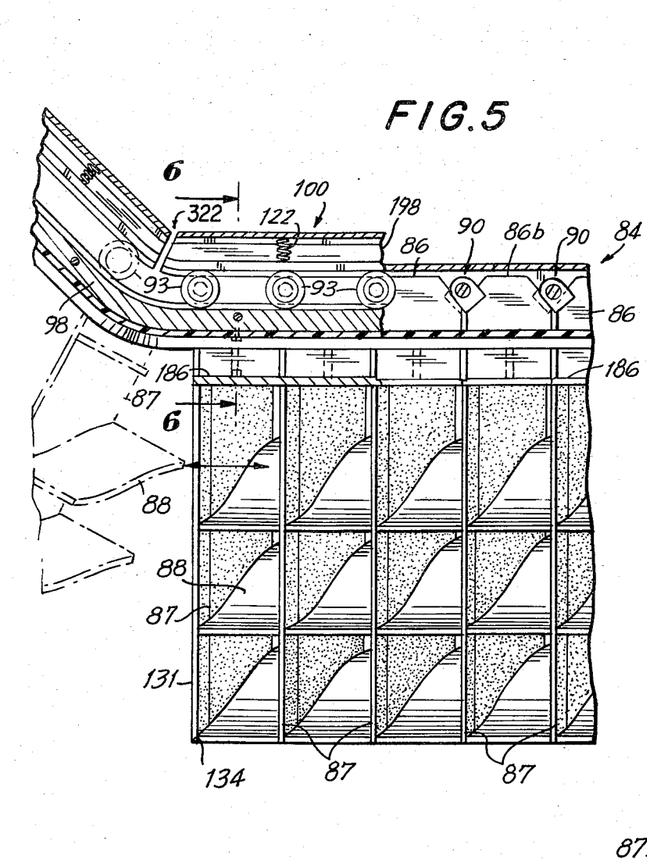
FIG. 5 is a section view along lines 5—5 of FIG. 4.
Figures 8, 9, 11:
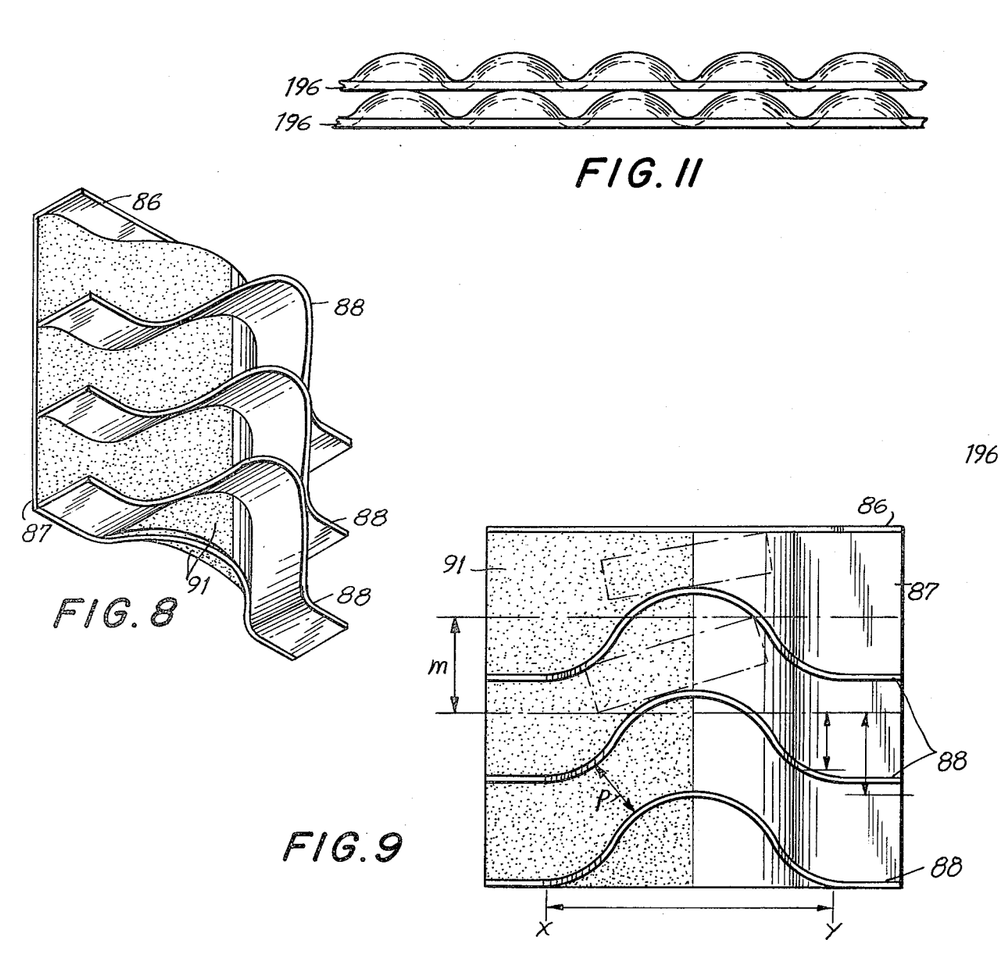
FIG. 8 is a perspective view of a single corrugated plate for the invention.
FIG. 9 is a schematic plan view showing the effectiveness of a set of the curved screening surfaces according to the present invention.
FIG. 11 is an edge view of the embodiment of the undulating screening surface shown in FIG. 10.

As shown in FIGS. 5 and 8, a series of substantially parallel secondary corrugated plates 88 are mounted on each primary corrugated plate 87. In the embodiment shown, the axes of the folds of the corrugations of the primary corrugated plates 87 extend substantially perpendicular to the direction of fluid flow (shown by the arrows in FIG. 4) and substantially perpendicular to the lower duct wall 132; the axes of the secondary corrugated plates 88 extend substantially perpendicular to the axes of the primary corrugated plates 87 and to the direction of fluid flow.

Figure 10:
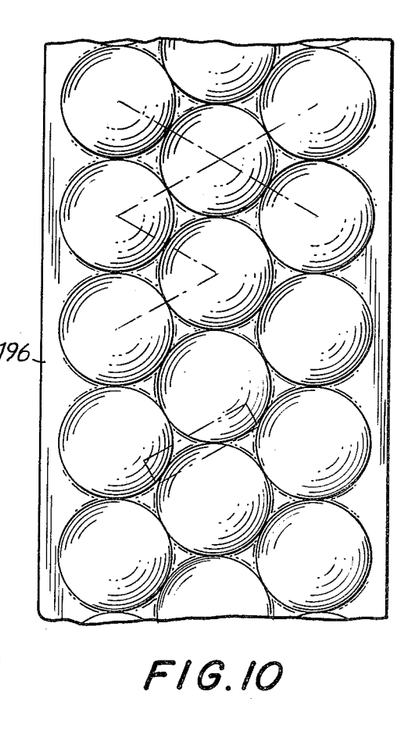
FIG. 10 is a plan view of a second embodiment of the undulating screening surface used in the present invention.

FIGS. 10 and 11 show an alternative embodiment to the screening plate 87. The screening plate 196 has dimpled surfaces, convex on one side, concave on the reverse side.

Figures 3, 7:
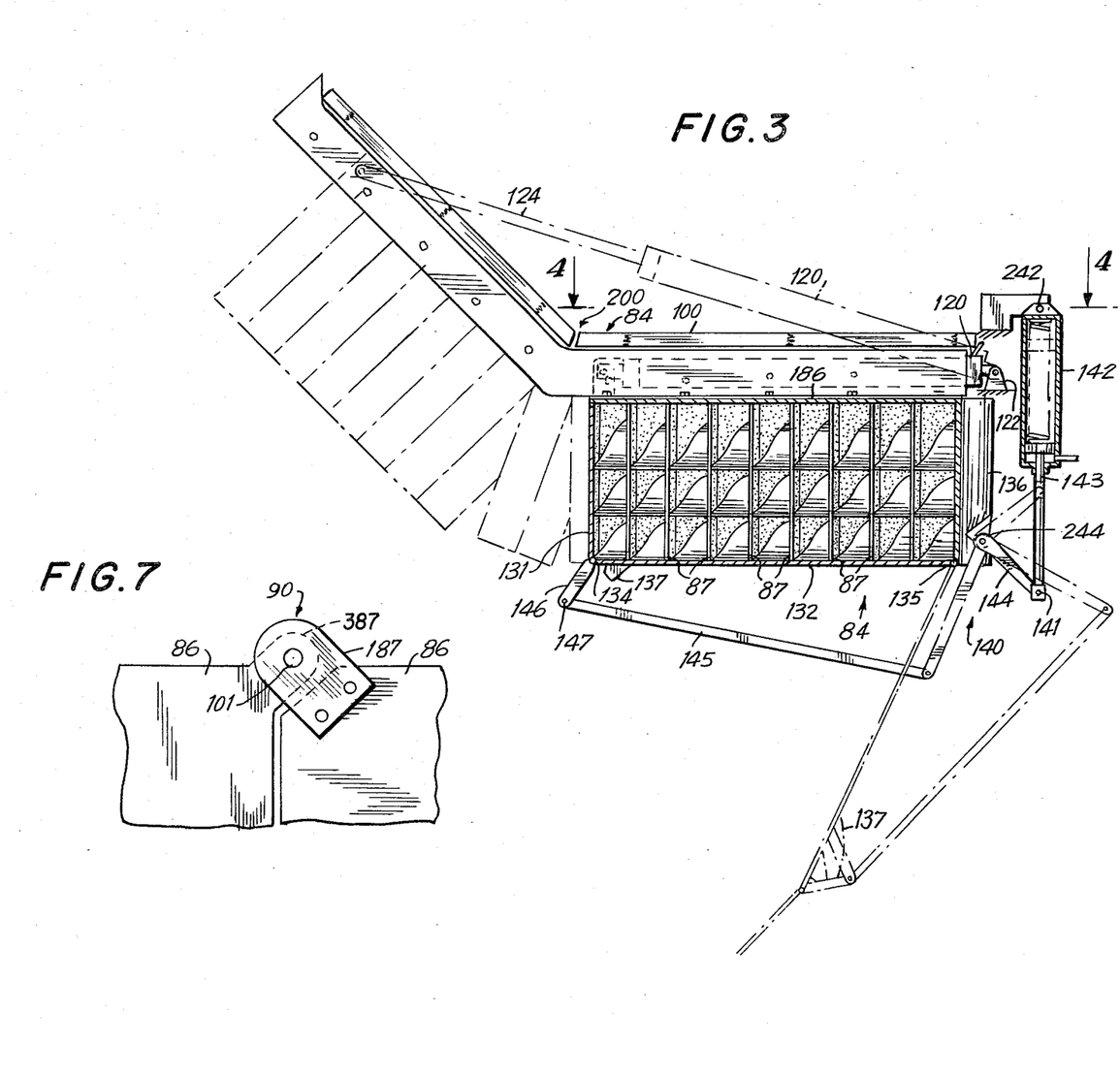
FIG. 3 is a cross-sectional elevation view of one embodiment of the present invention in a dredge conduit.
FIG. 7 is a magnified view of a portion of FIG. 5.
Figure 6:
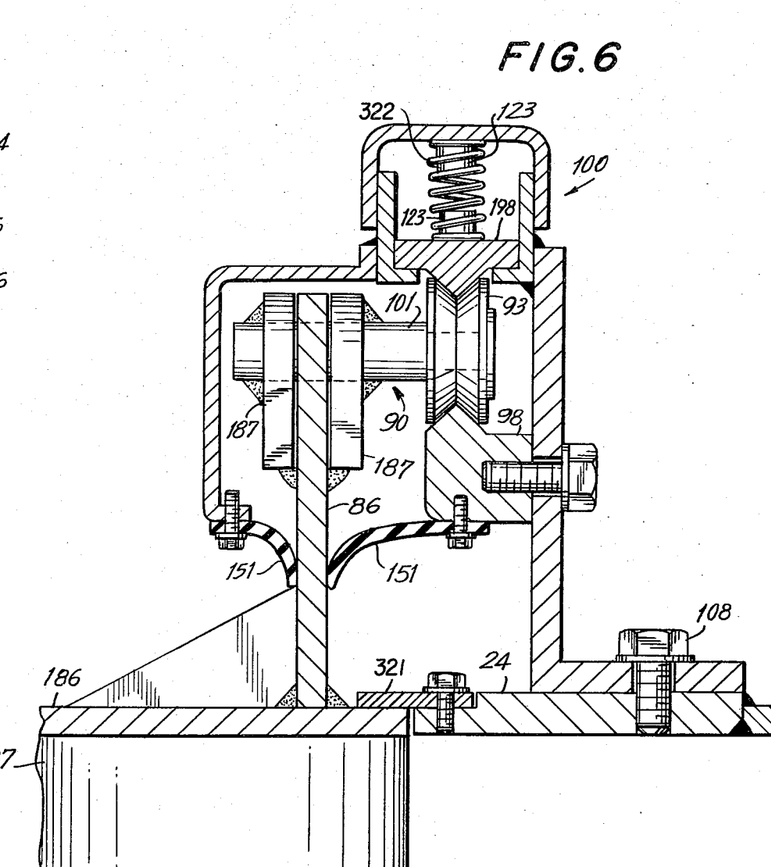
FIG. 6 is a section view along lines 6—6 of FIG. 5.

The mounting plates 86 are hingedly connected to one another by hinges generally indicated by the numeral 90, as shown in FIGS. 5 and 7. Each hinge 90 is rotatably connected (by axle 101) to a support roller 93. Each roller 93 is in turn mounted between and supported by mating roller tracks 98, 198. As shown in FIGS. 4, 5 and 6, the two pairs of roller tracks 98, 198 are each supported within a track housing generally indicated by the numeral 100 and located above the top edge of the duct 24. The tracks and housing 100 extend across the width of duct 24 and beyond, the tracks 98, 198 bending upwardly and away from the plane of the top surface of the duct 24.

As shown in FIG. 6, the roller 93 is supported from below by lower roller track 98 and from above by upper roller track 198, both of which are tapered and designed to fit into the groove in the roller 93. The upper roller track 198 is resiliently supported within the housing 100 by spring 322.

Each track housing 100 is rigidly connected to the top plate of the duct 24 by a series of stove bolts 108. The lower support track 98 is rigidly connected to the track housing 100.

Extending upwardly and outwardly from one upper corner of each mounting plate 86 is an ear piece 387. Extending from the opposite upper corner of each mounting plate 86 are a pair of earpieces 187 that sandwich the plate 86 and the single ear piece 387 extending from the immediately adjacent plate 86. The roller axle 101 passes through all three earpieces 387, 187, at each joint 90, but is rigidly attached to each outer earpiece 187, but rotatably held by the inner single ear piece 387.

A horizontal upper plate 186 is rigidly connected between the mounting plate 86 and the corrugated plate 87; the series of horizontal plates 186 form the upper surface of the duct 24 above the corrugated plates 87. To minimize leakage, a flexible sealing strip 321 is pressed across each joint, i.e., between adjacent upper plates 186 and between the ends of each upper plate 186 and the stationary upper surface of the duct 24 connected to the duct 24.

Extending centrally between the upper housings 100 is a hydraulic cylinder 120. The cylinder 120 is rotatably connected at one end to the main chassis support for the duct 24, by a hinge member 122. A piston rod 124 extends from the second end of the cylinder 120 and is reciprocally movably held therewithin. The free end of the piston rod 124 is rotatably connected to the top surface of the outermost horizontal plate 186, by hinge member 121.

To increase the likelihood of completely clearing a possible jam in the screening system, which is understandably important for a device intended to operate at the bottom of the ocean, the far side wall and the lower plate of the duct 24, adjacent the corrugated plates, swing outwardly. As shown, the far side wall 131, and the lower wall 132 are hingedly connected by, e.g., a piano hinge 134. Similarly, the lower wall 132 is hingedly connected, as by piano hinge 135, to the stationary duct wall. The lower wall 132 and the side wall 131 extend beyond the corrugated plate system 84, at both the upstream and downstream ends thereof.

The hinged side wall 131 and lower wall 132 are moved by a pair of lever systems generally indicated by the numeral 140. A hydraulic cylinder 142 is attached to the main chassis by pin 242 and contains a piston rod 143 reciprocally movable therewithin, to activate the lever system 140. The piston rod 143 is secured to a cross bar 141, each end of which is hingedly connected to one end of an angled lever rod 144, which is pivotally connected about its apex 244 to the main chassis. The second end of angled rod 144 is pivotally connected to one end of a long lever 145, which is in turn pivotally connected about its second end to a side lever 146, by way of a hinge 147. The second end of the side lever 146 is rigidly connected to the side wall 131 and hingedly connected to the lower wall 132, about hinge 134. The wall hinges 134, 135 are preferably spring-loaded such that the side wall 131 pivots outwardly before the lower wall 132 moves downwardly, and the lower wall 132 closes upwardly before the side wall 131 closes. The stop member 137 limits the pivoting movement of the side lever 146.

The hydraulic cylinder and piston 143 are preferably spring loaded to maintain the system in the closed condition if hydralic pressure fails.

Figure 1:
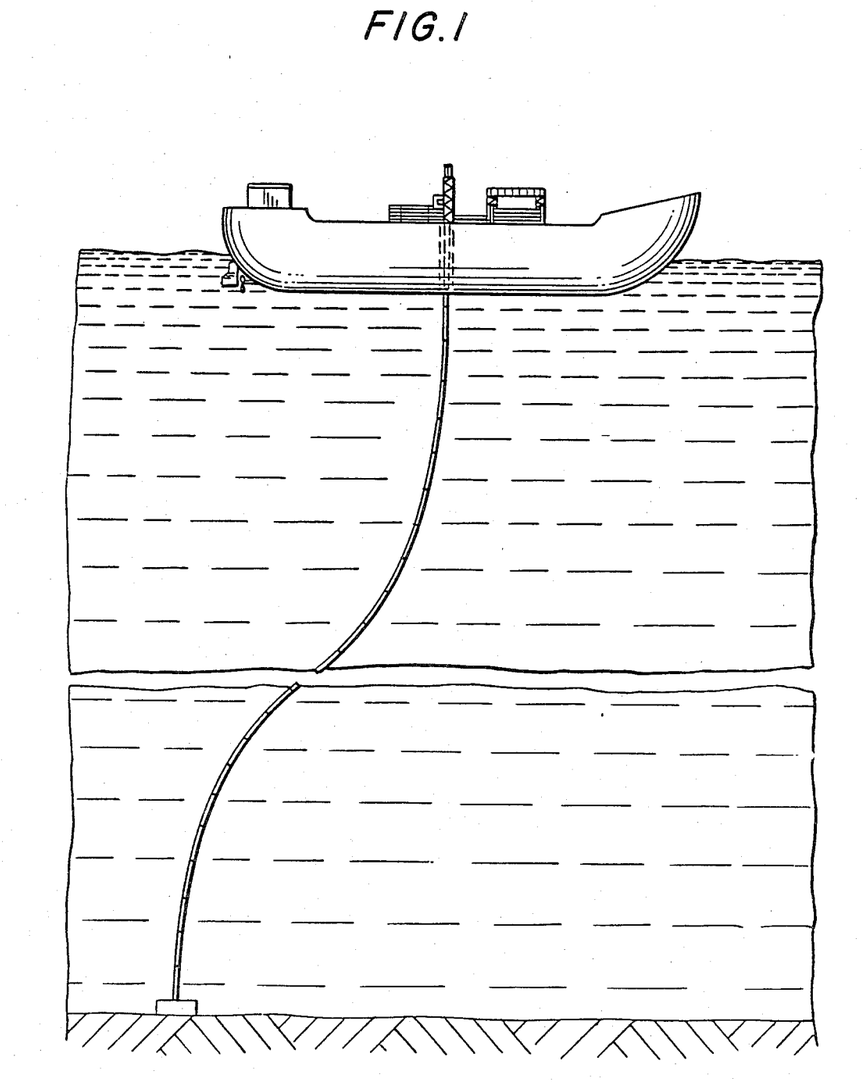
FIG. 1 is a diagram of a surface vessel towing a dredge vehicle of the type to include this invention.
Figure 2:
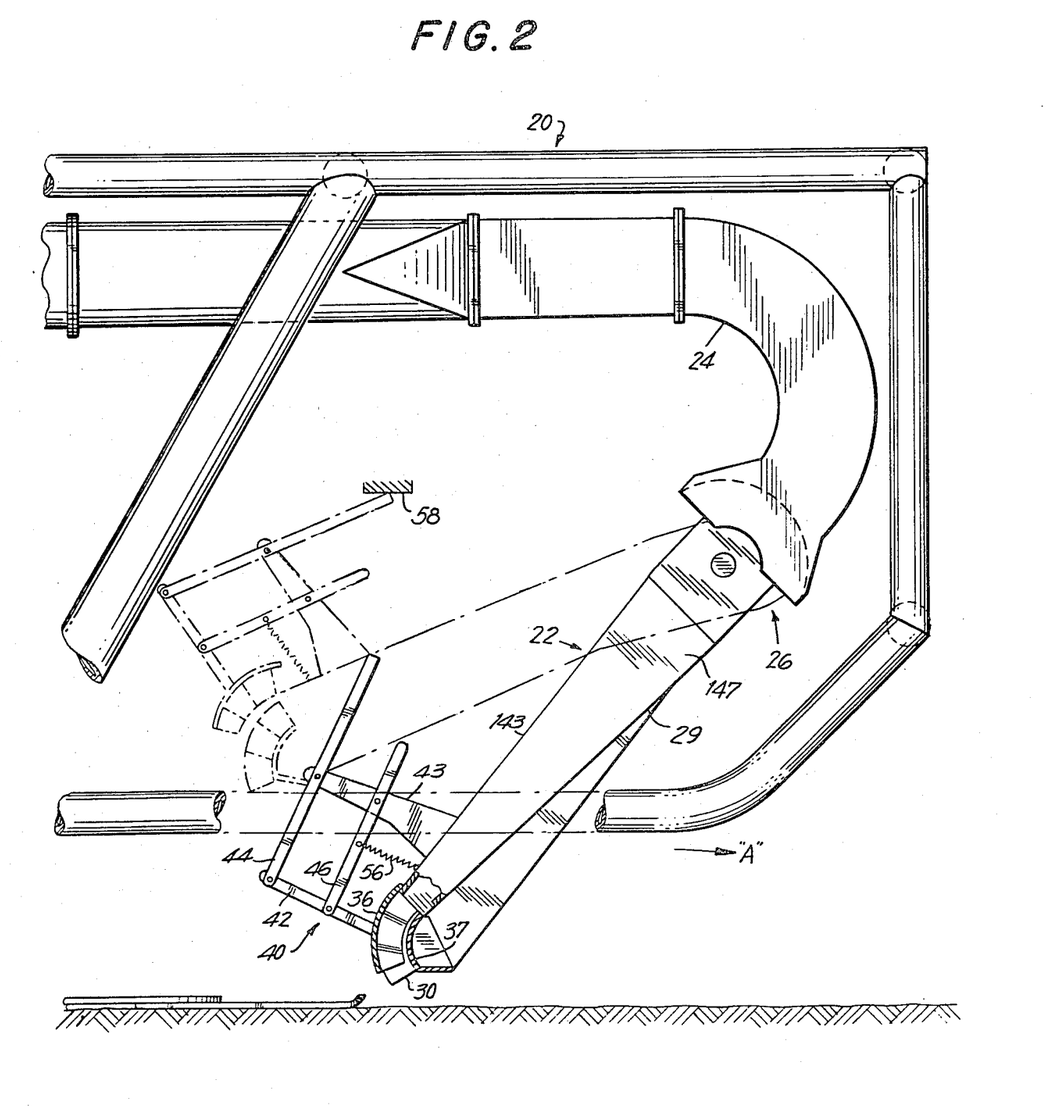
FIG. 2 is a side view of a dredge vehicle including this invention.

In the operation of an ocean floor dredge system including the present invention, the dredge can be moved forwardly, in the direction shown by the arrow "A" in FIG. 2 by, for example, a surface vessel, as shown in FIG. 1. The suction pump, located within the duct 24 downstream of the portion shown in FIG. 2, is activated to draw a stream of water into and through the nozzle opening 30, bringing into the nozzle together with the water the solid particles to be found on the ocean floor. The stream flows into the nozzle opening upward through the nozzle 22, through a portion of duct 24, then through the curved flow channels formed by the corrugated plates 87, within the duct 24, then through the remainder of duct 24, to the pump impeller chamber.

In the event of a plug forming in the duct, for example, by oversized particles being jammed between the corrugated plates 87, the plug being indicated by a decrease in pressure within the duct 24 upstream of the screening system 84, the corrugated plates can be separated and the duct 24 opened around the plates. First, the side hydraulic cylinder 142 is activated to move the piston rod 143 upwardly from the closed position (shown by solid lines in FIG. 3) to the open position (shown by phantom lines in FIG. 3). This causes the pivoting of the angled lever 144, which in turn moves the long lever 145 and the side lever 146, until the side lever moves against the stop member 137, at which point the side wall 131 has been opened, to the angle shown by phantom lines in FIG. 3, relative to the lower wall 132. Thereafter, continued pivoting movement of the angled lever 144 causes the lower wall 132 to swing downwardly, to the position shown by phantom lines in FIG. 3.

After the side wall 131 and the lower wall 132 are fully opened, the upper hydraulic cylinder 120 is activated, pushing the piston rod 124 outwardly. The piston rod 124 pulls the series of hingedly connected corrugated plates 87 outwardly and upwardly along the tracks 198, 98. As each roller 93 moves around the upward bend 200 in the tracks 98, 198, the corrugated plate 87 to which the roller 93 is attached (through the mounting plates 86 and horizontal plate 186) swings outwardly about the hinge 90. As is shown by the phantom lines in FIGS. 3 and 5, the spacing between the adjacent corrugated plates is thereby substantially increased at the bend. This permits any material jammed between those plates 87 to drop out. The piston rod 124 continues to move outwardly until all but the final one of the corrugated plates have passed around the track bend, permitting any jammed material to be expelled. As shown, the hydraulic cylinder 120 and the piston rod 124 pivot about their respective hinges 121, 122 to accommodate the upward movement along the angled tracks 100a,b.

After the jammed material is expelled the above procedure is reversed: the corrugated plates 87 are pulled back into the duct 24 by reversing the movement of the piston rod 124. After the corrugated plates 87 are returned to their operating position within the duct 24, the side cylinder 142 is reversed, so that the piston rod 143 moves downwardly causing the lever system 140 to reverse direction, first moving the lower wall 132 to its closed position and then the side plate 131 to its closed position.

During movement of the plates 87, the upper track 198 is maintained at the proper spacing from the lower track. This is accomplished by permitting limited movement of the upper track 198, as permitted by the spring hangers 122 and limited by the stop members 123.

Rubber flap seals 151 are provided to limit the entry of sediment into the track housing 100. The flaps 151 are secured to the housing 100, and are pressed against the support plates 86, permitting sliding movement of the plates 86.

The above type of screen separating system is especially effective, when used with a series of corrugated plates having folds about at least two mutually transverse preferably mutually perpendicular axes, as shown in greater detail in FIGS. 8 through 11, inclusive.

The primary corrugated plates 87 are each directly connected to the horizontal upper plate 186, the axis of the curve or fold on the corrugated plate 87 is perpendicular to the plane of the horizontal plate 186. Several secondary corrugated plates 88 are secured transversely to the convex curved surface of the primary corrugated plate 87. The axes of curvature of the secondary curved plates 88 are all parallel to each other and to the axis of the tracks 98, 198. In FIGS. 8 and 9, three secondary plates 88 are secured to each primary plate 87 and are equidistant from each other in order to exclude objects having a desired minimum size.

In order to provide a smoother flow path, and thus decrease undesirable turbulence, and also to reduce impact breakage of suspended particles, the upstream facing surfaces of the corrugated plates can be coated with an elastomeric, or rubbery, coating material 91. As shown in FIGS. 8 and 9, the upstream half of the convex surface of the primary plate 87 is coated. On the concave surface of each corrugated plate 87, the rubbery coating is applied to the apex of the curved portion of the plate, extending around on to the downstream surface, which faces in an upstream direction, and also, at least partially along the upstream portion of the concave curved surface.

This elastomeric coating serves to reduce breakage of, e.g., the ocean floor nodule ore, particles passing through the screening system suspended in flowing sea water. Useful elastomers include, e.g., natural rubber, silicone rubber, or polyurethane elastomer.

FIGS. 10 and 11 show an alternative multiaxially curved undulating screening plate. The plate 196 is dimpled, or impressed, with three columns of spherical, or spheroidal dimples, forming alternating concavities and convexities on the opposing major surfaces of each plate. The three columns are offset such that a line drawn through the center of any two adjacent dimples extends transversely to the direction of flow through duct 24. These dimpled plates 196 can be combined to form a screening device as shown above in FIGS. 3-7, replacing the corrugated plates 87.

The shape and dimensions for the set of screening plates used in accordance with this invention can be most readily accomplished by programmatic methods. The examples shown in the accompanying drawings have cross-sections forming circular arc segments. However, other curve forms, such as sinusoidal curves, can be utilized.

In determining the plate dimensions, and separation, the dimension of the largest particle to be passed must be determined based upon the internal size of the smallest duct in the line and the type of pump impeller utilized. In determining the maximum length of a rigid object ($l_3$), that can pass between a certain pair of undulating or corrugated opposed surfaces, the diameter ($l_4$) of the object must also be considered. Further, the angle that the axis of the object makes with respect to the horizontal direction of flow will effect the maximum length $l_3$ that can pass. For example, assuming the axis of curvature of each corrugated plate extends vertically, the maximum length ($l_3$) is determined by dividing the maximum length for a horizontal object ($l_H$) by the cosine of the angle ($\alpha$) the axis of the object makes with the horizontal, i.e., $l_3 = l_H/\cos\alpha$. It is seen that the closer the object is to the horizontal the more effective the screening effect. Thus, the transverse secondary plates 88, in the accompanying drawings, are effective because they limit the amount of tilt of the object from the horizontal. It has been found that curving the secondary plates 88, are even more effective than utilizing a flat secondary plate or a series of slender rods.

The corrugated or undulating plate of this invention can be formed of any substantially rigid material that has sufficient toughness, i.e., is not too brittle, to withstand the fluid flow and the impact of any solid particales suspended therein. The thinner each plate can be manufactured while retaining the required structural strength, the more desirable the material of construction. A thinner plate has less of an effect on the flow of the fluid, as does a mesh, or open, plate.

In one example of a suitable system, wherein the duct 24 is 12 ins. high and 13 ins. wide, the pump has a centrifugal impeller of radius of 11 ins. and upstream from the impeller a transition piece to a duct of rectangular cross section 25 ins. wide and 13 ins. high in which is installed excluder means FIG. 3, having a series of 8 primary plates 87, each having three secondary plates 88 are provided. Each plate is manufactured of polycarbonate polymer and is $\frac{1}{4}$ ins. thick. The curved length of each plate 87 (x-y) is 15 ins., and the fold is an arc of a circle having a radius of $4\frac{1}{2}$ ins. The distance separating the axes of the rollers 93 is 3 ins., (m), and the minimum distance between adjacent corrugated plates 87 is 2 ins. (p).

Alternatively, there can be used plates that are angularly bent, wherein the apex comes to a substantially sharp point or that form an irregular or discontinuous curve. This is less desirable, however, because of greater turbulence created by the flow passage.

As a further means for preventing the intake of oversized particles, there can be provided a conventional screening means, such as closely spaced parallel rods or a mesh of conventional design, upstream from the corrugated plates 87, e.g., at the nozzle opening.

The present invention, therefore, goes a step beyond the traditional screening means, such as a mesh, or spaced parallel rods, which exclude objects that are oversize in directions transverse to the flow through the nozzle inlet. This invention excludes objects where the oversize dimension is parallel to the direction of flow.

The patentable embodiments of this invention which are claimed are as follows:

1. In a liquid flow system conprising a liquid flow conduit, liquid pumping means for drawing a flow of liquid through the flow conduit, the conduit being in fluid flow connection with the inlet to the pump, and screening means located in fluid flow connection within the conduit for preventing the passage of long slender objects with any liquid flowing through the conduit and to the pump inlet, the screening means comprising:
    (a) a conduit for liquid flow; and
    (b) a plurality of pairs of separated, opposed complementarily aligned, undulating surfaces mounted within the conduit and defining restricted, curved separate channels for the flow of liquid, the undulating surfaces being arranged such that the axes of curvature of the undulating surfaces extend in at least two transverse directions, such that a long slender object of predetermined dimensions aligned in any direction cannot pass through any of the separate channels.

2. The system of claim 1 wherein the undulating surfaces are formed on the opposing surfaces of spaced plates.

3. The system of claim 2, wherein the spaced plates having undulating surfaces are dimpled plates.

4. The system of claim 3 wherein the dimples on the spaced dimpled plates are so formed that a line connecting the centers of any two adjacent dimples is transverse to the longitudinal axis of the flow conduit.

5. The system of claim 1 wherein each of the undulating surfaces comprises:
    (a) primary corrugated surfaces having folds with axes extending generally parallel to each other and transverse to the longitudinal axis of the flow conduit; and
    (b) at least a pair of secondary corrugated surfaces mounted on each primary corrugated surface, the axes of the folds of the secondary corrugated surfaces extending transverse to the longitudinal axis of the flow conduit and transverse to the axes of the primary corrugated surfaces.

6. The system of claim 5 comprising in addition a plurality of opposed primary corrugated plates mounted within the conduit, wherein the primary undulating surfaces are formed on the primary plates, and comprising secondary plates transversely mounted on the primary plates, wherein the secondary surfaces are formed on the secondary plates.

7. The system of claim 6 wherein the opposed corrugated surfaces are substantially parallel.

8. The system of claim 6 wherein the surfaces of the primary and secondary plates each comprise substantially continuous curved surfaces.

9. The system of claim 6 wherein the axes of the folds of the primary corrugated surfaces are perpendicular to the longitudinal axis of the flow conduit.

10. The system of claim 9 wherein the axes of the folds of the secondary corrugated surfaces are parallel to each other and perpendicular to the axes of the primary corrugated surface and perpendicular to the longitudinal axis of the flow conduit.

11. The system of claim 6 comprising in addition means for temporarily increasing the distance separating the opposed undulating surfaces, such that any material caught between adjacent surfaces is released.

* * * * *